G. C. MARTIN.
SHOCK ABSORBER.
APPLICATION FILED MAR. 19, 1910.
1,053,417.
Patented Feb. 18, 1913.
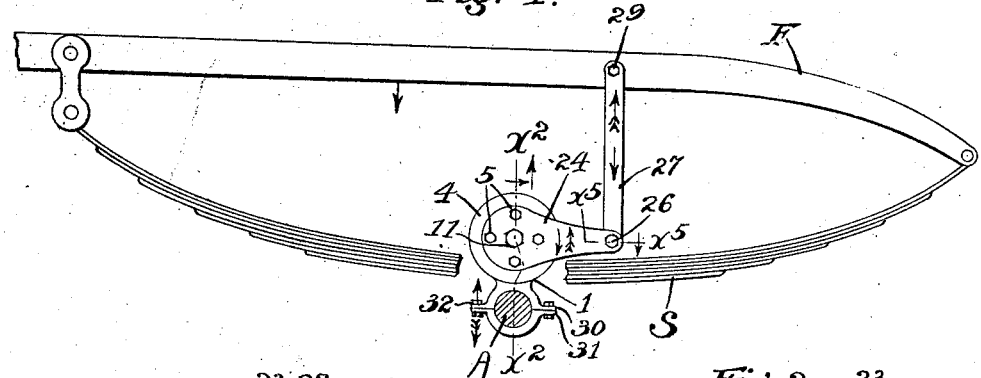
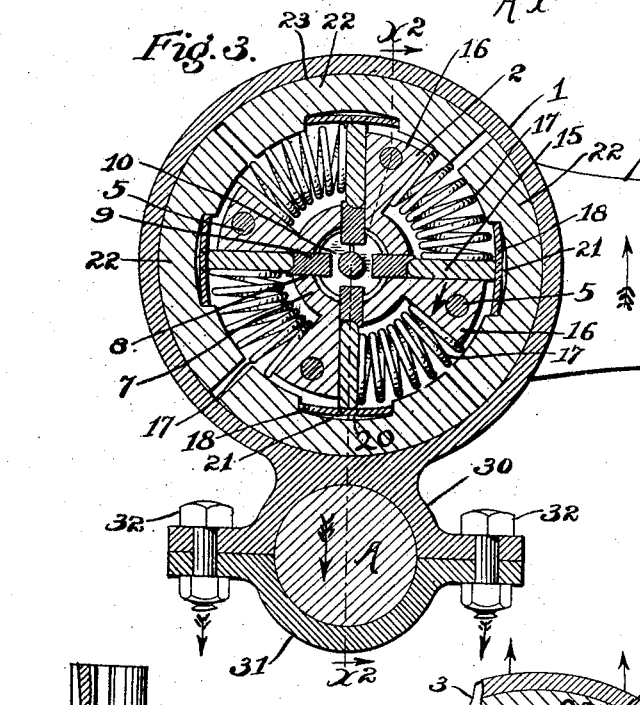
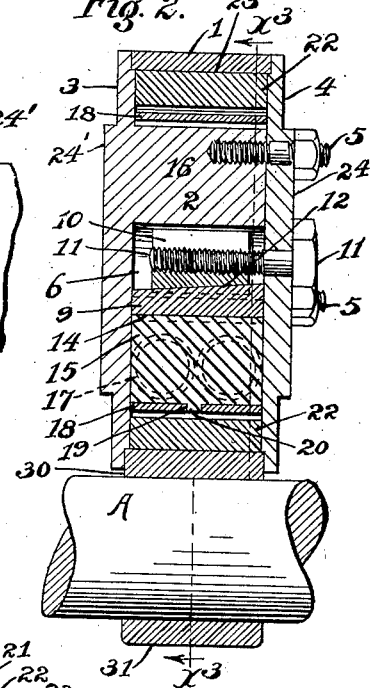
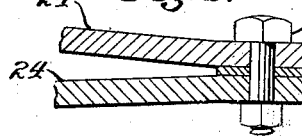
Witnesses:
G. H. Hiles.
L. Belle Rice.
Inventor:
George Cushing Martin
by James R. Townsend
his Atty.

UNITED STATES PATENT OFFICE.

GEORGE CUSHING MARTIN, OF LOS ANGELES, CALIFORNIA.

SHOCK-ABSORBER.

1,053,417.

Specification of Letters Patent. Patented Feb. 18, 1913.

Application filed March 19, 1910. Serial No. 550,522.

*To all whom it may concern:*

Be it known that I, GEORGE CUSHING MARTIN, a citizen of the United States, residing at Los Angeles, in the county of Los Angeles and State of California, have invented new and useful Improvements in Shock-Absorbers, of which the following is a specification.

The invention relates particularly to developmental improvements in my shock absorber, described in my application for patent, filed Nov. 4, 1909, Serial No. 526,260; patented May 30, 1911, No. 993,536.

The object of this invention is to simplify, and to still further develop the construction; to provide locking means for the adjusting screw and to reduce the cost of production to the minimum by so modifying some of the parts that a slight variation in the milling of the slots for the gibs, will produce mechanism operating either right hand or left hand as desired, in order to equip both ends of the vehicle axles with complementary operating parts.

Other objects and advantages may appear in the following detail description.

The invention may be embodied in various forms and includes the parts and combinations particularly pointed out in the appended claims.

The accompanying drawings illustrate the invention in some of the forms in which it may be constructed and mounted.

Figure 1 is a side elevation of the shock absorber mounted between a vehicle axle and a vehicle frame which is broken and is supported by a half elliptical spring, a portion of which is broken away to expose a part of the shock absorber which would otherwise be hidden thereby, this view being taken from the outside of the vehicle. Fig. 2 is a fragmentary vertical section on irregular line $x^2$, Figs. 1 and 3, looking toward the right. Fig. 3 is a section on irregular line $x^3$, Fig. 2 looking toward the left. The parts are shown in locked position, with the shoes exerting maximum pressure against the ring. Fig. 4 is a fragmentary sectional detail showing the position of parts of the shock absorber in unlocked position. In Figs. 1 and 3, feathered arrows indicate relative movement of parts for effecting the grip, and in Figs. 1 and 4 unfeathered arrows indicate relative movements of parts for effecting the grip to lock the shock absorber to resist the recoil of the spring. Fig. 5 is a fragmentary sectional detail on line $x^5$, Fig. 1. Fig. 6 is an enlarged sectional view of the slotted adjusting block looking at the shallow ends of the slots. Fig. 7 is an elevation of Fig. 6, a portion being broken away at one side to show one of the slots in profile.

In the drawings A is the axle, S the vehicle spring and F the vehicle frame.

The invention comprises two principal coaxial members or elements, which are relatively rotatable and may be constructed of one or more pieces as desired, one element constituting an annular shell or ring 1, and the other element comprising a centrally chambered radially slotted spider core 2 integral with a head 3 and fastened to another head 4 by bolts 5, so that the core and the two heads together form a unit. In the preferred form as shown in Figs. 2, 3 and 4, the core 2 has a cylindrical chamber 6 which can be readily bored out the inclosing circumferential wall 7 of which has a number of slots 8 cut through it to accommodate gibs 9 adapted to be engaged and supported by a cylindrical adjusting block or wedge 10 that fits and forms within the chamber a central support by which the thrust for causing frictional pressure of the shoes is borne, and that is carried inside the chamber 6 by an adjusting screw 11, the head of which rests externally against head 4. The wedge 10 is a cylindrical nut having in its perimeter longitudinal grooves 12, the floors of which converge lengthwise to form wedging seats for the wedge-shaped gibs 9, which thus key the wedge 10 to the core 2 and prevent the wedge from turning in the core while allowing it to move endwise. The wedge 10 has a radial longitudinal slit 13 formed by a saw cut to make it elastic, thus binding upon and locking the screw 11; the nut being of resilient material and the binding effect being increased by radial pressure through the gibs 9 in the practical operation hereinafter described. Each of the gibs 9 has a concave seat 14 in its outer face to receive the convex inner edge of toggle-bars 15, which are thus pivotally connected to the gibs 9.

The core 2 is externally recessed to form a number of radial arms 16, between which and the toggle-bars 15 are interposed helical tension springs 17, that tend to yieldingly hold the toggle-bars 15 in radial positions. The toggle-bars 15 thrust against the centers of flat springs 18, which are supported by the shoes only at their ends and have central perforations 19 to loosely accommodate bosses 20 on the outer ends of the toggle-bars 15, and to hold the bars and springs in pivotal relation. The springs 18 are seated in seats 21 within floating segmental friction or brake shoes 22, and afford resilient articulation of the shoes 22 with their respective toggle-bars 15, thus providing resilient toggle-joints. The slots 8 are cut radially of the axis of the core 2 and may be cut on either side of the arms 16, thus providing either left hand or right hand mechanism, (see Fig. 3,) in order that the parts may be applied to either end of the vehicle axle.

The friction shoes 22 accurately fit the inside annular friction surface 23 of the annular shell 1 and may be of any desired number and are preferably arranged in opposition with each other around the axis of rotation, so that the pressure of the shoes 22 against the inner annular friction surface 23 of the shell 1 may be equalized around said axis. The pressure of the friction shoes 22 upon the shell 1 is at a maximum when the toggle bars 15 are in radial position, as seen in Fig. 3. Through the action of the tension springs 18, the shoes are constantly in frictional engagement with the ring 1 and the amount of friction depends upon the degree of angularity of the toggle joint between the gib and the shoe: the friction being greatest when the toggle bar is in radial position relative to the axis of the core. The concave faces 14 of the gibs are in alinement at one side with the abutting faces of the radial arms of the core so that the toggle bars may lie flat against the nearly radial faces of such arms, thus to reach radial position. The amount of the pressure thus resisted will depend upon the strength and tension of the shoe springs 18.

The relative rotation of the core in the direction of the feathered arrow in Figs. 1 and 3 tends to move the inner end of the toggle-bar in the direction of said arrows while the friction of the shoes 22 on the ring 1 holds said shoes stationary with said ring; and the tendency of said rotation is to force the toggle-bars into radial position, the toggle springs 18 yield sufficiently to this pressure to allow the toggle-bars to go into radial position, and the arms 16 of the core prevent the toggle-bars from passing beyond such radial position, thus maintaining maximum friction between the shoes 22 and the inner surface of ring 1, and frictionally locking the ring 1 through the medium of the shoes 22, toggle joints 18 and 15, the gibs 9 and wedges 10, to the core 2. And a further relative rotation of the core in the direction indicated must overcome the friction thus established between the ring 1 and the shoes 22; the object being to thus lessen the recoil effect of the vehicle spring.

The releasing operation is as follows:— A relative rotation of the core in the direction opposite from that indicated by the feathered arrow releases the toggle joint and the frictional device by moving the inner end of the toggle bar in said opposite direction.

The floating shoes 22 being in frictional engagement with ring 1 prevent the outer end of the toggle-bar from rotating relatively with the inner end; thus throwing the toggle-bar out of radial position until it reaches the point where the friction between the shoes 22 and the ring 1 is insufficient to force the shoes to revolve with the inner surface of the ring 1, thus offering comparatively no resistance to the tendency of the vehicle frame and axle to approach each other when the wheels of the vehicle are passing over an obstruction in the road. It is understood that in usual practice the vehicle axle will be driven up from time to time with more or less abruptness, and frequency depending on the speed of the vehicle as the vehicle passes over obstructions or any inequalities in the road. The position for maximum resistance is shown in Fig. 3 while Fig. 4 shows the toggle-bar tipped out of radial position into a releasing position resulting from the approach of the vehicle axle and body as in the case of the wheel going over an obstruction. Fig. 3 shows the position assumed by the parts to resist the recoil of the vehicle spring.

Motion may be imparted to the rotatable members by a great variety of structural devices so that either one of said members may be rotated alone or both may be rotated in opposite directions relatively to each other. In the drawings complementary arms 24, 24' are at one end integral with their respective heads 3, 4, and are pivotally connected at the other end by a bolt 26 to a connecting rod 27 which extends up and is bolted to the vehicle body, frame, or chassis F by a bolt 29. This is illustrated in Figs. 1, 2, 3, and with such arrangement the shell 1 may have an upper clamping member 30 integral with it and bolted to a lower clamping member 31 by bolts 32, the said clamping members holding a portion of the vehicle axle A tightly between them.

In case the core is fixed, the shell 1, carrying with it shoes 22 is rotated in one direction, the pressure of shoes 22 against shell 1 is relieved by reason of the outer ends of the toggle-bars 15 being carried out of radial position; and the releasing effect is the same as before described. A comparatively slight reverse rotation of shell 1 that coincides with the initial movement of the vehicle spring when resuming its normally expanded position, returns toggle-bars 15 to radial position again. Further rotation of the shell 1 can thereafter only take place by slippage between the shell 1 and shoes 22.

The amount of friction that the shoes 22 offer to slippage may be increased by drawing up the wedge 10 by the adjusting screw 11, thus forcing gibs 9, and the inner ends of the toggle-bars 15 radially outward and so increasing the compression of the toggle springs 18. Reversing the movement of the adjusting screw 11 diminishes the tension. A great latitude of adjustment is thus possible so that one size of shock-absorber can be used to restrain vehicle springs of various sizes, but the proportion of the various parts may be altered to obtain the nicety of adjustment desired for any particular class of vehicle. It is essential that when the adjustment is made by turning the adjusting bolt 11 that the adjusting wedge 10 shall not rotate for the reason that the rotation of the adjusting wedge 10 would interfere with correct adjustment, the shoulders of the grooved slots providing stops in connection with the gibs preventing any rotation of the said adjusting block or wedge. The slot 13 in the adjusting nut is essential for the reason that the constant vibration while the automobile is being used will loosen the adjusting bolt unless it is clamped tight by means of the slotted nut.

I claim:

1. In a shock absorber, the combination with an element constituting an annular shell; of a second element comprising a centrally chambered radially slotted core; floating shoes to frictionally engage the shell; a slotted longitudinally grooved member in the chamber of the core; gibs in the grooves and slots; and resilient toggle-joint means between the gibs and shoes.

2. In a shock absorber, the combination with an element constituting an annular shell; of a second element comprising a centrally chambered radially slotted core; floating shoes to frictionally engage the shell; a longitudinally grooved member in the chamber of the core; gibs in the grooves and slots; and resilient toggle-joint means between the gibs and shoes, said core forming stops for the toggle-joint means.

3. In a shock absorber, the combination with an element constituting an annular shell, of a second element comprising a centrally chambered radially slotted core; floating shoes to frictionally engage the shell; a slotted longitudinally grooved member in the chamber of the core; the floors of the grooves being convergent; wedge-like gibs in the grooves and slots; resilient toggle-joint means between the gibs and shoes; and means for causing relative movement of the grooved member and the gibs to wedge the toggle-joint means.

4. In a shock absorber, the combination with an element constituting an annular shell; of a second element comprising a centrally chambered radially slotted core; floating shoes to frictionally engage the shell; a longitudinally grooved member in the chamber of the core; the floors of the grooves being convergent; wedge-like gibs in the grooves and slots, resilient toggle-joint means between the gibs and shoes, said core forming stops for the toggle-joint means, and means for causing relative movement of the grooved member and the gibs to wedge the toggle-joint means.

5. In a shock absorber, the combination with an element constituting an annular shell; of a second element comprising a centrally chambered radially slotted core, the chamber being cylindrical; floating shoes to frictionally engage the shell; a slotted longitudinally grooved cylindrical member in the chamber of the core; gibs in the grooves and slots; and resilient toggle-joint means between the gibs and shoes.

6. In a shock absorber, the combination with an element constituting an annular shell; of a second element comprising a centrally chambered radially slotted core; floating shoes to frictionally engage the shell; a longitudinally grooved member in the chamber of the core; gibs in the grooves and slots; and resilient toggle-joint means between the gibs and shoes, said core forming stops for the toggle-joint means, said gibs having concave faces for the toggle-joint means said faces being in alinement with one side of said stops.

7. In a shock absorber, the combination with an element constituting an annular shell, of a second element comprising a centrally chambered radially slotted core; floating shoes to frictionally engage the shell; a slotted longitudinally grooved nut in the chamber of the core; the floors of the grooves being convergent; wedge-like gibs in the grooves and slots; resilient toggle-joint means between the gibs and shoes; and a screw for causing relative movement of the grooved member and the gibs to wedge the toggle-joint means.

8. In a shock absorber, the combination with an element constituting an annular shell, of a second element comprising a centrally chambered radially slotted core; floating shoes to frictionally engage the shell; a resilient longitudinally grooved nut in the chamber of the core and having a radial longitudinal slit; the floors of the grooves being convergent; wedge-like gibs in the grooves and slots; resilient toggle-joint means between the gibs and shoes; and a screw for causing relative movement of the grooved member and the gibs to wedge the toggle-joint means.

9. In a shock absorber of the character set forth, the cylindrical nut having in its perimeter the longitudinal grooves 12 the floors of which converge lengthwise to form wedging seats substantially as set forth.

10. In a shock absorber of the character set forth, the cylindrical nut having in its perimeter the longitudinal grooves 12 the floors of which converge lengthwise to form wedging seats substantially as set forth, said nut being slotted to allow it to be compressed upon the adjusting screw of said shock absorber.

In testimony whereof, I have hereunto set my hand at Los Angeles, California, this 12th day of March, 1910.

GEO. CUSHING MARTIN.

In presence of—
JAMES R. TOWNSEND,
L. BELLE RICE.